(No Model.)

J. S. REAMER.
INDICATOR.

No. 452,111. Patented May 12, 1891.

Witnesses
J Shaw
U. Bienen

Inventor
James S. Reamer
By his Att. John Inirie Jr.

THE NORRIS PETERS CO., PHOTO-LITHO., WASHINGTON, D. C.

UNITED STATES PATENT OFFICE.

JAMES S. REAMER, OF PORTVILLE, NEW YORK.

INDICATOR.

SPECIFICATION forming part of Letters Patent No. 452,111, dated May 12, 1891.

Application filed November 13, 1890. Serial No. 371,292. (No model.)

*To all whom it may concern:*

Be it known that I, JAMES S. REAMER, a citizen of the United States, residing at Portville, in the county of Cattaraugus and State of New York, have invented certain new and useful Improvements in Advertising Devices or Indicators; and I do hereby declare the following to be a full, clear, and exact description of the invention, such as will enable others skilled in the art to which it appertains to make and use the same.

This invention relates to advertising devices or indicators; and it consists in certain improvements in the construction of the same, as hereinafter described and claimed.

Figure 1:
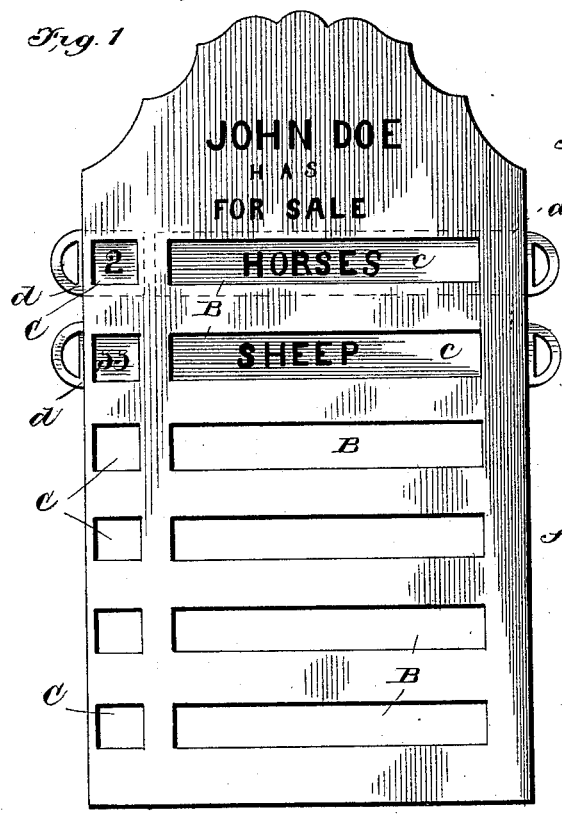
Figure 2:
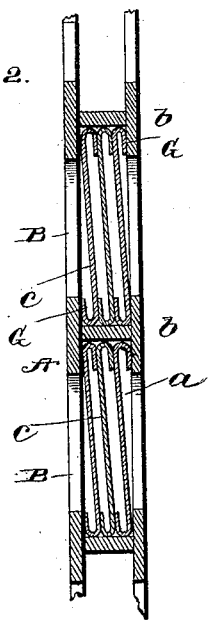
Figure 3:
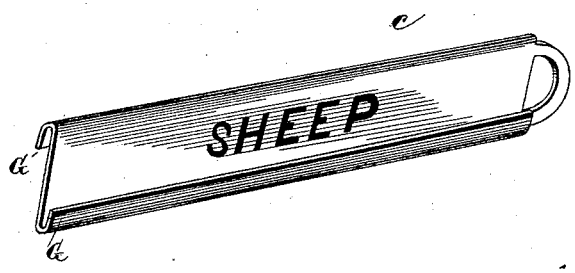

In the accompanying drawings, Figure 1 is a front view of my improved indicator. Fig. 2 is an enlarged view of a portion of the indicator, illustrating the same in section. Fig. 3 is a detached view of one of the advertising cards or slides.

A designates the rack in which the advertising-cards are mounted, the said rack being constructed of wood, sheet metal, or other suitable material. The front board of the indicator is provided with a series of large slots or openings B and a series of small openings C, one opening of each size being arranged on the same horizontal line, as shown. The vertical edge boards D are provided with slots or openings a, in which the slides or advertising-cards may be inserted in position to be seen by persons standing in front of the indicator. The T-formed cleats b are fastened to the back of the front board of the rack and extend across the same, being each located between two lines of the openings B and C in position to support and retain the slides or advertising-cards in place. The said slides are of two sizes, the large slides c being intended to bear the names of animals or of articles which a farmer or dealer may have for sale and the small slides d being intended to have numbers thereon to indicate the numbers of such animals or of bushels of certain articles offered for sale. In Fig. 1 two lines of the slides are represented as set to indicate that the proprietor has two horses and thirty-three sheep for sale. The slides c, with names marked on them, are to be inserted from one side through slots a and between cleats b to be in position to be seen through the openings B, and the slides d, with numbers on them, are inserted from the opposite side to be seen through the openings C. The said slides are made, preferably, of sheet metal and have their upper and lower edges bent over, as shown at G in Fig. 2, the upper edges being bent rearward and the lower edges forward, so that when the slides are in position in the rack their marked faces are inclined slightly forward, being thus adapted for the sight when the indicator is placed in an elevated position. Several of these slides are placed together in each division of the rack, as shown in the drawings, and the bent edges serve somewhat as binding-springs and allow any of the slides to be readily withdrawn from the rack, as desired. The slides are painted or marked with names or numbers on both sides, and may be drawn out and reversed in position in the rack, as desired. Another advantage of this construction is that the slides placed together in a division of the rack are spaced apart for convenience in drawing them out severally and replacing them, and also to prevent the painted or marked surfaces being rubbed one against another. In case the slides are made of wood or other material than sheet metal the upper and lower edges of the slide are enlarged or provided with beads G, which extend along the edges, so that the printed or marked surfaces are kept from being rubbed or worn away. (See Fig. 3.) Springs g may be employed to press the slides forward and keep them in place when some of the slides in a division of the rack have been withdrawn. The said spring may be either a coiled spring or may be in the form of a bow, as shown, and may be secured to a back board of the indicator.

I claim—

1. The combination, with the rack provided with slots or openings B and C in the front and slots a in the edge boards, of a series of sheet-metal slides provided with indicating-marks, the upper and lower edges of said slides being bent in opposite directions, as shown, and fixed cleats adapted for supporting said slides in position, substantially as and for the purposes described.

2. The combination, with the rack of an indicator, of a series of marked or indicating slides, which are constructed of sheet metal and removably placed in said rack, each of said slides having its upper and lower edges bent over in opposite directions, substantially as set forth and described.

In testimony whereof I affix my signature in presence of two witnesses.

JAMES S. REAMER.

Witnesses:
C. M. HORNBLOWER,
H. I. LANGWORTHY.